(12) United States Patent
Traina

(10) Patent No.: US 7,789,026 B2
(45) Date of Patent: Sep. 7, 2010

(54) CULTIVATED BIOMASS POWER SYSTEM

(76) Inventor: John E. Traina, 9 Sweet Water La., Pittsburgh, PA (US) 15238

( * ) Notice: Subject to any disclaimer, the term of this patent is extended or adjusted under 35 U.S.C. 154(b) by 1805 days.

(21) Appl. No.: 10/336,112

(22) Filed: Jan. 3, 2003

(65) Prior Publication Data

US 2004/0129188 A1 Jul. 8, 2004

(51) Int. Cl.
*F23B 7/00* (2006.01)
(52) U.S. Cl. ...................... 110/341; 110/234
(58) Field of Classification Search ................ 110/233, 110/346, 342, 344; 47/58.1 R
See application file for complete search history.

(56) References Cited

U.S. PATENT DOCUMENTS

| | | | | |
|---|---|---|---|---|
| 4,203,374 A | * | 5/1980 | Frederick | ................ 110/258 |
| 4,326,382 A | | 4/1982 | Baardson | |
| 4,414,813 A | | 11/1983 | Knapp | |
| 4,429,732 A | | 2/1984 | Moscrip | |
| 4,437,419 A | * | 3/1984 | Hertel | ................ 110/259 |
| 4,532,873 A | * | 8/1985 | Rivers et al. | ................ 110/347 |
| 4,572,086 A | * | 2/1986 | Ladt et al. | ................ 110/347 |
| 4,848,249 A | * | 7/1989 | LePori et al. | ................ 110/234 |
| 5,035,727 A | | 7/1991 | Chen | |
| 5,343,819 A | * | 9/1994 | Charest | ................ 110/233 |
| 5,934,076 A | | 8/1999 | Coney | |
| 5,935,842 A | * | 8/1999 | Moll | ................ 435/257.1 |
| 6,100,600 A | | 8/2000 | Pflanz | |
| 6,220,033 B1 | | 4/2001 | Labinov et al. | |
| 6,453,829 B1 | * | 9/2002 | Tsai et al. | ................ 110/203 |
| 6,536,360 B2 | * | 3/2003 | O'Connor | ................ 110/341 |

FOREIGN PATENT DOCUMENTS

DE 195 02 953 A1 12/1995

* cited by examiner

*Primary Examiner*—Kenneth B Rinehart
(74) *Attorney, Agent, or Firm*—Buchanan Ingersoll & Rooney PC

(57) ABSTRACT

In a power generation system biomaterial is grown in a biomass field near a furnace. The plants or oils from the plants are periodically harvested and burned by the furnace to generate steam which runs a generator. Waste heat from the furnace and condenser is collected and returned to the biomass field. The by-products of combustion, principally heat, carbon dioxide, water vapor and ash, are in part cycled back to a biomass field as input energy and nutrients.

13 Claims, 1 Drawing Sheet

CULTIVATED BIOMASS POWER SYSTEM

BACKGROUND OF THE INVENTION

As countries abandon nuclear power the world has seemingly lost, at least for the foreseeable future, any hope of economically producing large amounts of electrical power without a continuous stream of effluent being discharged to the atmosphere. Other essentially pollution free technologies such as solar panels, wind, geothermal, ocean thermal and ocean tide, while all important, fall well short of producing a significant portion of our present and future electrical power needs. These alternative technologies suffer from a variety of problems all resulting in higher cost per megawatt than conventional means. The United States Department of Energy has spent over $1 billion over the last ten years on solar power alone. At present solar power produces less than one percent of our electrical needs at a cost of approximately five times that of coal.

To be precise, the difficulty with present electrical power generation has much more to do with the fuel than the process. The vast majority of hazardous materials as well as greenhouse gases that are emitted from fossil fuel burning electrical power plants are result of the fuel. This is particularly true when the fuel is coal. While present regulations put restrictions on certain dominant pollutants other dangerous pollutants continued to be emitted with little or no control. These include but are not limited to radioactive material, mercury, boron, arsenic, cyanide, and chromium.

Therefore, there is a need for an alternative method of electrical power generation that uses fuel that is both economically efficient and environmental friendly.

Many attempts have been made to generate energy from renewable resources. Indeed, the goal of several projects has been to provide continuous energy from regenerative energy sources. The produced energy can be stored with universally understood energy storage devices, but can also be directly employed in industrial production processes. Certain selected system technology can be used in an advantageous manner because the individual processes can compliment one another or even depend upon one another. For example, U.S. Pat. No. 6,100,600 discloses a system with a floating or an anchored support structure with a plurality of energy converters for the regenerative energy sources ocean water, ocean waves, wind, and solar radiation. The most significant shortcomings of this system are that it must be installed in the ocean, at a significant distance from where most energy is used, and that large quantity energy storage is difficult.

German Patent Document 195 02 953, discloses a mechanical energy generator which combines wind energy, water energy, solar energy and biomass energy. An energy storage device is disclosed which collects the different types of energies in the form of rotational energy and this energy is converted by a generator into electric current. This device can be used on land as well as on the ocean. In principle, it is possible to convert basically any type of energy into rotational energy. In order to be able to use this energy, the storage devices with their generators must be operated in the vicinity of the supply network in order to be able to supply the current to the consumer. When connection to a network is not possible, a chemical energy storage must be employed in order to allow transport of energy to the consumer. Furthermore, with rotating masses, which receive a corresponding amount of energy, a complicated service and maintenance system is required and friction will cause a certain amount of loss.

Many have proposed the use of biomass as an energy source. Indeed, it is well known that biomass can be burned to generate heat that is converted into electricity. However, biomass has been used primarily as a supplemental fuel because no cost effective way has been found to supply sufficient quantities of biomass fuel to produce large amounts of electrical power. Furthermore, the biomass is typically garbage or other refuse and not material specifically created for fuel purposes.

SUMMARY OF THE INVENTION

I provide a power generation system that relies upon cultivated biomass to provide sufficient amounts of fuel to produce large amounts of power. In one embodiment the fuel is dried plankton. In another embodiment the fuel is oil produced by plants, particularly certain aquatic plants. The plants are grown in a biomass field near a furnace. The plants or oils from the plants are periodically harvested and burned by the furnace to generate steam which runs a generator. Some or all of the waste heat from the furnace and condenser is collected and returned to the biomass field. The by-products of combustion are principally heat, carbon dioxide, water vapor and ash. These by-products, which normally make up smoke stack emissions, are in part cycled back to a biomass field as input energy and nutrients.

Other objects and advantages of the invention will become apparent from a description of certain present preferred embodiments thereof.

DESCRIPTION OF THE PREFERRED EMBODIMENTS

Figure 1:
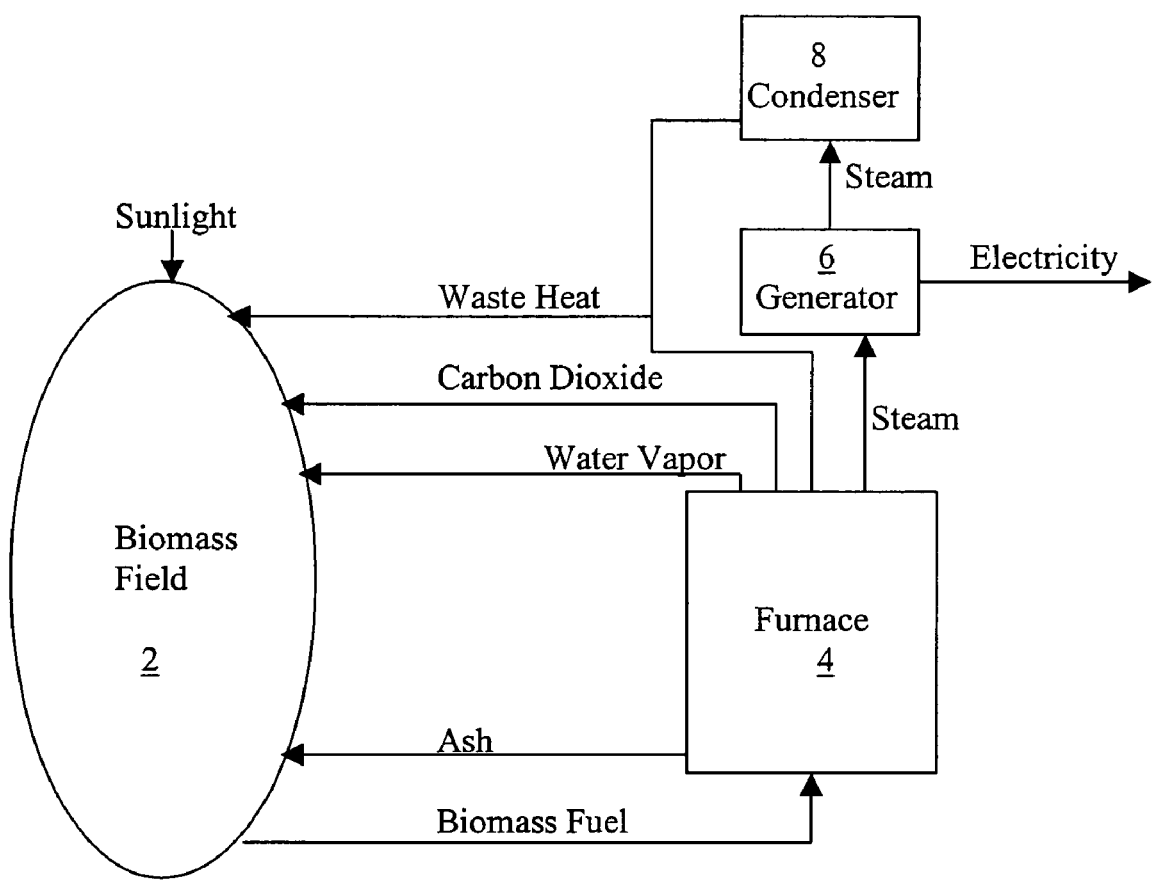
FIG. 1 is a diagram of my power system.

As illustrated by FIG. 1, I provide a biomass field 2 in which plants are grown that either are used for fuel or produce extracts that are used for fuel. Sunlight enters the biomass field to grow the plants. The biomass fuel is transferred to the furnace 4 where it is burned to produce steam. The steam drives a generator 6 that produces electricity. It is expected and fully anticipated that existing steam cycle boilers will be converted to use this invention. Waste heat from either or both of the furnace 4 and the condenser 8 is directed back to the biomass field 2 to encourage plant growth. Other by-products of combustion, particularly water vapor and carbon dioxide, are also recycled back to the biomass field, typically through pipes. Ash from the furnace will contain nutrients and is also in part sent back to the biomass field. The goal is to obtain a partially closed loop system to which only sunlight and air are added and in which the biomass field supplies all the needed fuel to produce the desired amount of electricity. In many applications it may be necessary or prudent to provide a supplemental fuel source to the furnace and/or supplemental nutrients to the biomass field.

In a first present preferred embodiment of the invention there is a partially closed fuel cycle. Fuel is both consumed and created when utilizing this method. The fuel is dried plankton, which can have a consistency similar to wood pulp. Other plants could be used. But, plankton is preferred because plankton grows faster than most plants. For that reason, plankton is cheaper to grow per unit of energy produced. The fuel may be burned to produce heat for any purpose. In this embodiment the heat is used as input energy for a classic turbine steam cycle, which in turn rotates a generator and produces electricity. The by-products of combustion, principally heat, carbon dioxide, water vapor and ash, are cycled back to a biomass field as input energy and nutrients. In principle, it is not necessary that any of these by products be returned to the biomass field since the biomass will grow in open-air. But, I prefer to use these by-products to grow the biological material rather than dispose of them as waste. The biomass field in this embodiment is a matrix of ponds exposed to sunlight, which adds additional energy to the field. The field must be large enough that the average energy input from the sun is greater than the average energy expected to be output from the system. Additional solar energy will be required depending upon the conversion efficiency of photosynthesis process. It is important to note that the system operates on average energy values because of the ability of the biomass to be harvested and stored during periods that it is not growing. In this embodiment the plankton is harvested through series of pumps and screens in a process similar to that used by the paper industry in handling wood pulp. Some of the return heat of combustion is, in this embodiment, used to dry the harvested plankton. This plankton may be used as fuel immediately or most importantly stored for periods when the biomass field is producing less fuel than the process needs. Conveyors, air streams, trucks, carts or other vehicles could be used to transport the biomass from the field or storage location to the furnace.

Also of importance is the fact that in this embodiment some or all of the heat lost to the condenser in the steam cycle is also conserved by returning this heat to the biomass field. This returned heat, plus the heat, carbon dioxide and water vapor from combustion, accelerate the biomass growth by creating a warm, carbon dioxide rich environment. It is important to note that even without returning any of the waste heat or gases, the process would produce zero net carbon dioxide and still be environmentally friendly compared to conventional coal-fired plants. If the condenser heat is not used sufficiently then thermal pollution would still be of concern and would most likely require cooling towers to meet current standards.

The plankton in the growing process, uses carbon dioxide and water to make carbohydrates and oxygen. Oxygen is given off to the biomass atmosphere. In this embodiment, the oxygen rich, carbon dioxide depleted atmosphere created by the biomass is offset by the oxygen depleted carbon dioxide rich furnace gases with the excess vented to the outside atmosphere. What is of importance is the fact that the combustion of the biomass material whether in a closed cycle, partially closed cycle, or open cycle has a net zero affect on greenhouse emissions. The hazardous emissions are comparable to that of natural gas with the oxides of nitrogen being a primary pollutant.

The most prevalent gaseous hazardous emissions produced when burning coals are sulfur dioxide and nitric oxide. In this invention sulfur dioxide is not present in the gaseous emissions since sulfur is not in the fuel in any meaningful amount. The carbon dioxide (greenhouse gas) is partially used by the biomass in creating fuel. The amount of carbon dioxide removed from the atmosphere by the biomass must equal the amount produced in the burning process irrespective of whether or not there is a closed cycle, a partially closed or open cycle. The result is a net zero emission of this greenhouse gas. Depending upon the combustion characteristics, varying amounts of oxides of nitrogen will be produced. Present technology allows for these oxides to be broken down in a catalytic process in the presence of ammonia. The technology has a constant concern over "ammonia slip", a problem wherein the catalyst becomes less effective resulting in the ammonia not reacting with the oxides of nitrogen and therefore exiting to the atmosphere. This invention can easily accommodate this technology with less concern for ammonia slip since ammonia, which is water-soluble nitrogen, would be a nutrient for the biomass.

In this embodiment some or all of the particulate matter (ash etc.) is returned to and used by the biomass field essentially eliminating particulate matter from emissions. It is anticipated that some of the fly ash would be removed from the combustion gas stream by conventional methods (electrostatic precipitators, bag houses etc.). Conveyors, air streams, trucks, carts or other vehicles could be used to transport the ash from the furnace to the biomass field or to a storage location.

Plankton was chosen for this embodiment because of its high growth rate (possible to double mass every 24 hours) and the extensive availability of information concerning its growth and health. It is fully expected and anticipated that a bio-engineered material will ultimately serve as the biomass. The characteristics that are expected to be examined in that development are: better conversion of solar energy into carbohydrates, easier to harvest, reduced need for nutrients, higher heat content per unit mass, use of a single organism (plankton is not) for better control and health, more rapid growth, viable over wider temperature and carbon dioxide levels, and lower tendency for disease, to name a few.

A second present preferred embodiment uses oil-producing plants in the biomass field. Many plants produce fats and oils both of which have high heat values. In this embodiment and aquatic version of such a plant is employed. The plant has been modified to produce copious amounts of oil while growing in a shallow warm water environment. The oil floats to the top of the water where it can be separated by a variety of known technologies. This embodiment has all the environmental advantages of the plankton embodiment with the added advantage of decreased harvesting cost and higher heat content of the fuel.

The waste heat of combustion as well as the condensing cycle is used to maintain water temperature during cooler months. This maintains an extended high growth rate season. All or a portion of the combustion flue gas is expected to be bubbled through the water to increase the carbon dioxide levels around the plants as well as remove any ammonia slip. Fly ash will also be "scrubbed" by the water.

While certain present preferred embodiments have been shown and described, it is distinctly understood that the invention is not limited thereto but may be otherwise embodied within the scope of the following claims.

I claim:

1. A method of producing energy comprising:
growing in a biomass field a biomass material for use as a combustion fuel,
transferring the biomass material from the biomass field to a furnace or to storage,
burning the biomass material in the furnace to produce heat and products of combustion selected from the group comprised of water vapor, carbon dioxide and ash,
using a first portion of the heat to produce steam, and
returning a second portion of the heat to the biomass field.

2. The method of claim 1 also comprising generating electricity from the steam produced by the furnace.

3. The method of claim 1 also comprising condensing the steam in a condenser and returning heat from the condenser to the biomass field.

4. The method of claim 1 also comprising returning to the biomass field from the furnace at least some products of combustion selected from the group consisting of water vapor, carbon dioxide and ash.

5. The method of claim 1 wherein the biomass field grows plankton and also comprising periodically harvesting plankton from the biomass field for use as the
    biomass material and drying the harvested plankton before transferring the biomass material to the furnace or to storage.

6. The method of claim 1 wherein the biomass field grows oil producing plants and also comprising periodically collecting oil from the plants for use as the biomass material before transferring the biomass material to the furnace or storage.

7. A system for producing power comprising:
   a biomass field that produces biomass material grown for use as combustion fuel,
   a furnace that burns the biomass material to produce heat, ash, carbon dioxide and water vapor, and
   means for transferring at least one of a portion of the carbon dioxide and a portion of the water vapor from the furnace to the biomass field.

8. The system of claim 7 also comprising means for transferring at least a portion of the ash from the furnace to the biomass field.

9. The system of claim 7 also comprising means for transferring at least a portion of the heat from the furnace to the biomass field.

10. The system of claim 7 wherein pipes comprise the means for transferring at least one of a portion of the carbon dioxide and a portion of the water vapor from the furnace to the biomass field.

11. A method of producing energy comprising:
    growing in a biomass field a biomass material for use as a combustion fuel,
    transferring the biomass material from the biomass field to a furnace or to storage,
    burning the biomass material in the furnace to produce heat and products of combustion selected from the group comprised of water vapor, carbon dioxide and ash, and
    returning at least one of a portion of the carbon dioxide and a portion of the water vapor from the furnace to the biomass field.

12. The method of claim 11 also comprising transferring a portion of the heat produced by the furnace from the furnace to the biomass field.

13. The method of claim 11 also comprising transferring a portion of the ash produced by the furnace from the furnace to the biomass field.

\* \* \* \* \*